(12) United States Patent
Tilford

(10) Patent No.: US 9,879,426 B2
(45) Date of Patent: Jan. 30, 2018

(54) BASE-MEDIATED HYDROPHOBING COMPOSITIONS AND PROCESSES

(71) Applicant: Georgia-Pacific Gypsum LLC, Atlanta, GA (US)

(72) Inventor: Robert William Tilford, Stone Mountain, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 1079 days.

(21) Appl. No.: 14/108,713

(22) Filed: Dec. 17, 2013

(65) Prior Publication Data

US 2014/0178624 A1   Jun. 26, 2014

Related U.S. Application Data

(60) Provisional application No. 61/739,862, filed on Dec. 20, 2012.

(51) Int. Cl.
| | |
|---|---|
| *E04C 2/26* | (2006.01) |
| *E04C 2/04* | (2006.01) |
| *C04B 28/14* | (2006.01) |
| *C04B 111/27* | (2006.01) |

(52) U.S. Cl.
CPC ............ *E04C 2/26* (2013.01); *C04B 28/14* (2013.01); *E04C 2/043* (2013.01); *C04B 2111/27* (2013.01); *Y10T 428/22* (2015.01)

(58) Field of Classification Search
None
See application file for complete search history.

(56) References Cited

U.S. PATENT DOCUMENTS

| | | | | |
|---|---|---|---|---|
| 5,153,805 A * | 10/1992 | Tennant | .............. | H02H 5/042 361/106 |
| 5,626,668 A | 5/1997 | Gerhardinger et al. | | |
| 5,817,262 A * | 10/1998 | Englert | .............. | C04B 11/02 162/164.4 |
| 7,803,226 B2 * | 9/2010 | Wang | ................ | C04B 28/14 106/772 |
| 7,892,472 B2 | 2/2011 | Veeramasuneni et al. | | |
| 2004/0050287 A1 * | 3/2004 | Windridge | .......... | C04B 24/42 106/2 |
| 2006/0035112 A1 * | 2/2006 | Veeramasuneni | ...... | C04B 14/304 428/703 |
| 2006/0278127 A1 * | 12/2006 | Liu | .................. | C04B 28/145 106/638 |
| 2008/0009566 A1 | 1/2008 | Blackburn et al. | | |
| 2010/0186870 A1 | 7/2010 | Stuart et al. | | |
| 2011/0054053 A1 * | 3/2011 | Lee | .................. | C04B 24/246 521/83 |
| 2012/0082858 A1 * | 4/2012 | Przybysz | ............ | C04B 28/14 428/447 |
| 2014/0272376 A1 * | 9/2014 | Aldabaibeh | .......... | C04B 38/10 428/312.4 |

FOREIGN PATENT DOCUMENTS

| | | |
|---|---|---|
| EP | 1112986 A1 | 7/2001 |
| JP | 09142915 A | 6/1997 |
| WO | 9828240 A1 | 7/1998 |

OTHER PUBLICATIONS

International Search Report and Written Opinion dated Apr. 10, 2014 (PCT/US2013/075638).

* cited by examiner

*Primary Examiner* — Marc Zimmer
(74) *Attorney, Agent, or Firm* — Ram W. Sabnis

(57) ABSTRACT

Water-resistant gypsum boards and compositions and methods for their manufacture are provided. The methods include forming a mixture of water, hydroxide, and siliconate, adding siloxane to the mixture, adding calcium sulfate hemi-hydrate to the mixture to form an aqueous slurry, curing the aqueous slurry under heat, drying the aqueous slurry, and forming a water-resistant gypsum board.

16 Claims, No Drawings

BASE-MEDIATED HYDROPHOBING COMPOSITIONS AND PROCESSES

CROSS-REFERENCE TO RELATED APPLICATIONS

This application claims priority to U.S. Provisional Application No. 61/739,862, filed Dec. 20, 2012, which is incorporated herein by reference in its entirety.

BACKGROUND

The present invention relates generally to the field of gypsum boards, and more particularly to water-resistant gypsum boards and methods for their manufacture.

Gypsum boards are commonly used as the exterior sheathing panels in building construction. Because sheathing panels may be exposed to water or high humidity, gypsum boards for these applications should be water-resistant to reduce or eliminate: loss of board strength, microbiological growth, and delamination of facings. Accordingly, many attempts have been made to improve the water-resistance of the set gypsum that forms the gypsum boards, which has a tendency to absorb water.

These attempts have included the incorporation of water-resistant additives such as metallic soaps, asphalts, siloxanes, and resins into the gypsum slurry, as well as coating finished gypsum boards with water-resistant films or coatings. For example, one siloxane additive that has been used to improve the water-resistance of gypsum products is polymethylhydrogensiloxane (PMHS). Generally, a small amount of siloxane is added to the gypsum slurry before the board is formed and dried. It has been observed, however, that the siloxane frequently does not completely cure in a reasonable period of time or never completely cures. In these cases, the water resistance does not develop to a satisfactory level and the siloxane can be released as a VOC from the finished board.

It has been determined that for such siloxane additives to cure properly during the gypsum board manufacture process, they may be thermally cured or cured with a curing agent. For example, curing agents may include siliconates, such as potassium methyl siliconate or sodium methyl siliconate. When a thermal siloxane curing process only is used, it is critical that the temperature of the slurry reach curing temperature. Otherwise, the siloxane curing reaction may not be completed for sometime after manufacture. Curing agents must be provided in amounts that do not cure the siloxane too rapidly and do not interfere with the rehydration and setting of the gypsum during the board manufacturing process.

Accordingly, it would be desirable to provide improved water-resistant gypsum boards utilizing siloxanes, and methods and compositions for their manufacture.

SUMMARY

In one aspect, a method is provided for making a water-resistant gypsum board. The method includes forming a mixture of water, hydroxide, adding siloxane to the mixture, adding calcium sulfate hemi-hydrate to the mixture to form an aqueous slurry, curing the aqueous slurry under heat, drying the aqueous slurry, and forming a water-resistant gypsum board. In certain embodiments, the mixture also includes siliconate.

In another aspect, water-resistant gypsum boards are provided that are made from the methods described herein.

In one embodiment, a water-resistant gypsum board includes a gypsum core that is made of a mixture of calcium sulfate hemi-hydrate, siloxane, hydroxide, and a fibrous mat at least partially penetrating a surface of the gypsum core. In certain embodiments, the gypsum core also includes siliconate.

In yet another aspect, a composition for the manufacture of gypsum board is provided, including calcium sulfate hemi-hydrate, hydroxide, and siloxane. In certain embodiments, the composition also includes siliconate.

DETAILED DESCRIPTION

Disclosed herein are water-resistant gypsum boards and methods for their manufacture. As used herein, the term "water-resistant" refers to the ability of a prefabricated gypsum product, such as a gypsum board, to limit the uptake of water by the gypsum substrate and retain the dimensional stability and mechanical integrity of the product. For example, water resistance may be measured by the amount of water uptake by a gypsum product when immersed in water for a set period.

Gypsum boards are commonly made by mixing calcined calcium sulfate dihydrate, such as calcium sulfate hemi-hydrate, with water and any additives to form a slurry. In the slurry, the calcined gypsum reacts with water to form calcium sulfate dihydrate, which may be formed and dried to produce a fairly hard and rigid product referred to as set gypsum.

The boards described herein utilize a siloxane additive to impart water-resistance properties to the set gypsum. Upon curing the siloxane, it is believed that the polymers crosslink to form a hydrophobic barrier. Curing of the siloxane may be done thermally and/or with curing agents. In certain embodiments, the siloxane has the structure:

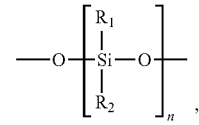

wherein $R_1$ is H, halogen, alkyl, aryl, heteroaryl, cycloalkyl, haloalkyl, haloaryl, perhaloalkyl, or perhaloaryl, $R_2$ is H, halogen, alkyl, aryl, heteroaryl, cycloalkyl, haloalkyl, haloaryl, perhaloalkyl, or perhaloaryl, and n is 1-100. For example, the siloxane may be poly(methylhydrogensiloxane) (PMHS), which has a single hydrogen atom directly bonded to the silicon atom in the backbone. The other substituent may be any alkyl group or halogen substituted alkyl chain. For example, PMHS may include XIAMETER 1107, which is commercially available from Dow Corning Corporation (Midland, Mich.), or BLUESIL WR 68, which is commercially available from Bluestar Silicones USA (East Brunswick, N.J.).

Siliconate may be used as a curing agent for siloxane-containing gypsum boards. It is believed that the basic siliconate accelerates the curing process of the siloxane by increasing the pH of the slurry containing the siloxane, thereby catalyzing polymer crosslinking. In certain embodiments, a siliconate curing agent has the structure:

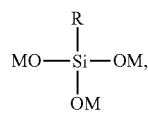

wherein R is H, halogen, alkyl, aryl, heteroaryl, cycloalkyl, haloalkyl, haloaryl, perhaloalkyl or perhaloaryl, and M, in each occurrence independently, is sodium, potassium, or lithium. For example, the siliconate may be sodium methyl siliconate, potassium methyl siliconate, or a combination thereof.

It is generally believed that strong bases should not be used as curing agents because the higher pH interferes with the rehydration of the gypsum in the slurry and may be corrosive to the gypsum. However, because water chemistry may vary based on manufacturing conditions, weak bases may not raise the pH of the slurry to the level necessary to completely cure the siloxane. Without being bound by a particular theory, Applicants believe certain siloxanes require a pH of 9 or above to cure. Water may have a pH of around 6-8. Thus, the addition of a relatively small amount of a weak base to the gypsum slurry containing a siloxane may not be effective to cause the pH adjustment necessary to cure the siloxane.

Applicant has surprisingly found that hydroxides, such as sodium hydroxide, potassium hydroxide, lithium hydroxide, or combinations thereof, may replace or be used in combination with current curing agents, without causing corrosion of the gypsum or interfering with its rehydration. Because hydroxides cause rapid evolution of hydrogen when reacted with siloxanes, the amount of hydroxide added to the gypsum slurry must be carefully selected to avoid overly accelerating or decelerating the curing reaction. Without being bound by a particular theory, it is believe that hydroxides, alone or in combination with siliconate-based curing agents, raise the pH more efficiently than traditional curing agents. Hydroxides may also provide a more cost-effective alternative as compared to current curing agents.

Accordingly, in certain embodiments, a composition for the manufacture of gypsum board may include calcium sulfate hemi-hydrate, siloxane, and hydroxide. The composition may also include siliconate. For example, the composition may include 100 parts by weight calcium sulfate hemi-hydrate, about 0.1 to about 2.0 parts by weight siloxane, about 0.025 to about 0.5 parts by weight hydroxide, and about 0.1 to about 2.0 parts by weight siliconate. The composition may also include about 50 to about 100 parts by weight water.

In certain embodiments, methods for making water-resistant gypsum boards include forming a mixture of water and hydroxide, adding siloxane, adding calcium sulfate hemi-hydrate to the mixture to form an aqueous slurry, curing the aqueous slurry under heat, drying the aqueous slurry, and forming a water-resistant gypsum board. The mixture may also include siliconate. For example, the aqueous slurry may include 100 parts by weight calcium sulfate hemi-hydrate, about 50 to about 100 parts by weight water, about 0.1 to about 2.0 parts by weight siloxane, about 0.025 to about 0.5 parts by weight hydroxide, and about 0.1 to about 2.0 parts by weight siliconate. In certain embodiments, the pH of the aqueous slurry is above 9.

For example, the siloxane may be added to the mixture while stirring. For example, drying the aqueous slurry may include heating it sufficiently to remove excess water.

In certain embodiments, the hydroxide includes sodium hydroxide, potassium hydroxide, lithium hydroxide, or a combination thereof. The hydroxide may be a metal hydroxide. For example, the hydroxide may be sodium hydroxide, potassium hydroxide, lithium hydroxide, rubidium hydroxide, caesium hydroxide, francium hydroxide, calcium dihydroxide, magnesium dihydroxide, beryllium dihydroxide, strontium dihydroxide, barium dihydroxide, and radium dihydroxide or a combination thereof. For example, the hydroxide may be in solid form or in solution form. In one embodiment, a hydroxide solution may include hydroxide in an amount from about 10 to about 50 weight percent in water. For example, the hydroxide solution may include hydroxide in an amount of about 20 weight percent in water.

In certain embodiments, the siliconate has the structure:

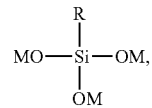

wherein R is H, halogen, alkyl, aryl, heteroaryl, cycloalkyl, haloalkyl, haloaryl, perhaloalkyl, or perhaloaryl; and M, in each occurrence independently, is sodium, potassium, or lithium. For example, the siliconate may be sodium methyl siliconate, potassium methyl siliconate, or combinations thereof. For example the siliconate may be XIAMETER 1107, which is commercially available from Dow Corning Corporation, or SILRES BS 16, which is commercially available from Wacker Chemical Corporation (Adrian, Mich.).

In certain embodiments the siloxane has the structure:

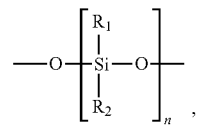

wherein $R_1$ is H, halogen, alkyl, aryl, heteroaryl, cycloalkyl, haloalkyl, haloaryl, perhaloalkyl, or perhaloaryl; $R_2$ is H, halogen, alkyl, aryl, heteroaryl, cycloalkyl, haloalkyl, haloaryl, perhaloalkyl, or perhaloaryl; and n is 1-100. For example, the siloxane may be poly(methylhydrogensiloxane) (PMHS).

For example, curing the aqueous slurry may include heating the aqueous slurry at a temperature of about 35° C. to about 300° C. Similarly, drying the aqueous slurry may include heating the aqueous slurry at a temperature of about 40° C. to about 300° C. For example, the aqueous slurry may be cured and/or dried in an oven. Curing the aqueous slurry may include catalyzed cross-linking of the siloxane.

In certain embodiments, additives such as accelerators, dispersants, foaming agents, retarders, and combinations thereof may be added to the mixture. For example, accelerators may include calcium sulfate dihydrate, potassium sulfate, or a combination thereof. For example, dispersants may include polynaphthalene sulfonate, polycarboxylates, or a combination thereof. For example, foaming agents may include sulfonated alcohol ethoxylate. For example, retarders may include diethylenetriaminopentaacetates.

Water-resistant gypsum board may be made by any of the methods described herein. For example, a water-resistant gypsum board may include a gypsum core that includes a mixture of calcium sulfate hemi-hydrate, siloxane, and hydroxide, and a fibrous mat at least partially penetrating a surface of the gypsum core. In certain embodiments, the gypsum core also includes siliconate.

In certain embodiments, the water-resistant board absorbs water in an amount of about 5 weight percent to about 15 weight percent. For example, the water-resistant board may absorb water in an amount of less than 10 weight percent.

Water-resistant gypsum boards were prepared according to the methods described herein. To replicate the large scale manufacturing conditions described above, the components were thoroughly mixed and formed, allowed to set for 1 hour at room temperature (i.e., approximately 70° F.), dried for 1 hour in an oven at 100° C., and then stored for 24 hours in an oven at 100° F. The dry set boards were weighed and then submerged in water at room temperature for 2 hours. The superficial water was then removed from the surface of the boards and the boards were weighed to measure the amount of water absorbed by the board.

Comparative samples A1, A2, and A3 were prepared by combining 400 g calcined gypsum, 300 g water, 1 g BLUE-SIL WR 68 (PMHS), and 0.5 g SILRES BS 16 (siliconate). Samples B1, B2, and B3 were prepared by combining 400 g calcined gypsum, 300 g water, 1 g BLUESIL WR 68 (PMHS), and 0.5 g of 20% w/v sodium hydroxide solution. The results of the submersion tests are shown in Table 1, including the dry and wet weights of the boards, and the raw difference, percent difference, average percent difference, and standard deviation of the dry versus wet weights of the boards.

TABLE 1

Submersion Test 1 Results

|    | Dry (g) | Wet (g) | Diff  | % Diff. | Avg. % Diff. | Std. Dev. |
|----|---------|---------|-------|---------|--------------|-----------|
| A1 | 122.23  | 147.45  | 25.22 | 20.63   | 21.38        | 3.05      |
| A2 | 130.13  | 153.65  | 23.52 | 18.07   |              |           |
| A3 | 114.69  | 143.85  | 29.16 | 25.43   |              |           |
| B1 | 112.95  | 139.30  | 26.35 | 23.33   | 24.33        | 0.73      |
| B2 | 106.19  | 132.81  | 26.62 | 25.07   |              |           |
| B3 | 118.70  | 147.90  | 29.20 | 24.60   |              |           |

The results show that substituting hydroxide in place of a standard siliconate-based curing agent did not result in a significant increase in water adsorption of the gypsum board.

Additional tests 2 and 3 were performed utilizing varying concentrations of sodium hydroxide solution in an amount of 0.5 g, combined with 400 g calcined gypsum, 300 g water, and 1 g BLUESIL WR 68 (PMHS). Specifically, samples B1, B2, and B3 used 0.5 eq sodium hydroxide solution, while samples C1, C2, and C3 used 1.0 eq sodium hydroxide solution, and samples D1, D2, and D3 used 1.5 eq sodium hydroxide solution. Comparative samples A1, A2, and A3 used 0.5 g SILRES BS 16 (siliconate) instead of the sodium hydroxide solution.

The pH levels of the slurries were measured as follows. The water had a pH of 8.1, samples A had a pH of 11.0, samples B had a pH of 11.3, samples C had a pH of 11.4, and samples D had a pH of 11.6.

The results of submersion tests 2 and 3 are shown in Tables 2 and 3, respectively.

TABLE 2

Test 2 Sample Compositions and Results

|          |    | Dry Weight (g) | Wet Weight (g) | Diff. | % Diff. | Avg. % Diff. | Std. Dev. |
|----------|----|----------------|----------------|-------|---------|--------------|-----------|
| SILRES   | A1 | 115.4          | 131.7          | 16.3  | 14.1    | 10.6         | 3.2       |
| BS 16    | A2 | 115.9          | 127.3          | 11.4  | 9.8     |              |           |
|          | A3 | 120.2          | 129.7          | 9.5   | 7.9     |              |           |
| 0.5 eq   | B1 | 129.5          | 143.3          | 13.8  | 10.7    | 11.0         | 0.3       |
| NaOH     | B2 | 123.3          | 136.8          | 13.5  | 10.9    |              |           |
|          | B3 | 128.0          | 142.4          | 14.4  | 11.3    |              |           |
| 1.0 eq   | C1 | 117.3          | 129.7          | 12.4  | 10.6    | 9.9          | 0.6       |
| NaOH     | C2 | 114.7          | 125.5          | 10.8  | 9.4     |              |           |
|          | C3 | 116.7          | 127.9          | 11.2  | 9.6     |              |           |
| 1.5 eq   | D1 | 121.7          | 130.0          | 8.3   | 6.8     | 6.5          | 0.5       |
| NaOH     | D2 | 125.1          | 132.4          | 7.3   | 5.8     |              |           |
|          | D3 | 121.9          | 130.1          | 8.2   | 6.7     |              |           |

TABLE 3

Test 3 Sample Compositions and Results

|          |    | Dry Weight (g) | Wet Weight (g) | Diff. | % Diff. | Avg. % Diff. | Std. Dev. |
|----------|----|----------------|----------------|-------|---------|--------------|-----------|
| SILRES   | A1 | 113.7          | 123.2          | 9.5   | 8.4     | 8.2          | 0.1       |
| BS 16    | A2 | 119.5          | 129.3          | 9.8   | 8.2     |              |           |
|          | A3 | 114.1          | 123.3          | 9.2   | 8.1     |              |           |
| 0.5 eq   | B1 | 112.3          | 125.1          | 12.8  | 11.4    | 11.8         | 1.5       |
| NaOH     | B2 | 113.7          | 129.1          | 15.4  | 13.5    |              |           |
|          | B3 | 120.7          | 133.5          | 12.8  | 10.6    |              |           |
| 1.0 eq   | C1 | 110.9          | 122.1          | 11.2  | 10.1    | 11.9         | 2.2       |
| NaOH     | C2 | 124.9          | 138.8          | 13.9  | 11.1    |              |           |
|          | C3 | 107.9          | 123.4          | 15.5  | 14.4    |              |           |
| 1.5 eq   | D1 | 115.8          | 122.5          | 6.7   | 5.8     | 7.7          | 1.9       |
| NaOH     | D2 | 114.3          | 123.4          | 9.1   | 8.0     |              |           |
|          | D3 | 107.5          | 117.7          | 10.2  | 9.5     |              |           |

Tables 2 and 3 further demonstrate that using a hydroxide solution in place of a standard curing agent does not result in a significant increase in water adsorption of the gypsum board. Rather, Applicants observed improved water resistance, as low as 6.5 and 7.7 average percent weight difference between the wet and dry boards.

The results of submersion tests 2 and 3 also show that the water resistance of the boards is improved with increased hydroxide concentration. Furthermore, samples C and D were observed to be sweating profusely on the surface after submersion, which Applicants believe indicates that the PMHS has formed a hydrophobic barrier and the water is being driven from the surface of the board.

Accordingly, hydroxides, alone or in combination with siliconate, may be used as efficient and cost-effective curing agents in gypsum board manufacturing with siloxanes.

Embodiments of the present disclosure further relate to any one or more of the following paragraphs:

1. A method for making a water-resistant gypsum board, comprising:
   forming a mixture of water, hydroxide, and siliconate;
   adding siloxane to the mixture;
   adding calcium sulfate hemi-hydrate to the mixture to form an aqueous slurry;
   curing the aqueous slurry under heat;
   drying the aqueous slurry; and
   forming a water-resistant gypsum board.
2. The method of paragraph 1, wherein the pH of the aqueous slurry is above 9.
3. The method of paragraph 1, wherein the hydroxide comprises metal hydroxide.
4. The method of paragraph 3, wherein the metal hydroxide comprises sodium hydroxide, potassium hydroxide, lithium hydroxide, rubidium hydroxide, caesium hydroxide, francium hydroxide, calcium dihydroxide, magnesium dihydroxide, beryllium dihydroxide, strontium dihydroxide, barium dihydroxide, and radium dihydroxide or a combination thereof.

5. The method of paragraph 1, wherein the hydroxide is in solid form or in solution form.

6. The method of paragraph 1, wherein curing the aqueous slurry comprises heating the aqueous slurry at a temperature of about 35° C. to about 300° C.

7. The method of paragraph 1, wherein drying the aqueous slurry comprises heating the aqueous slurry at a temperature of about 40° C. to about 300° C.

8. The method of paragraph 1, wherein the siliconate has the structure:

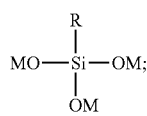

wherein R is H, halogen, alkyl, aryl, heteroaryl, cycloalkyl, haloalkyl, haloaryl, perhaloalkyl, or perhaloaryl; and M, in each occurrence independently, is sodium, potassium, or lithium.

9. The method of paragraph 8, wherein the siliconate is sodium methyl siliconate.

10. The method of paragraph 8, wherein the siliconate is potassium methyl siliconate.

11. The method of paragraph 1, wherein the siloxane has the structure:

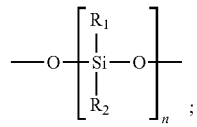

wherein $R_1$ is H, halogen, alkyl, aryl, heteroaryl, cycloalkyl, haloalkyl, haloaryl, perhaloalkyl, or perhaloaryl; $R_2$ is H, halogen, alkyl, aryl, heteroaryl, cycloalkyl, haloalkyl, haloaryl, perhaloalkyl, or perhaloaryl; and n is 1-100.

12. The method of paragraph 11, wherein the siloxane is poly(methylhydrogensiloxane).

13. The method of paragraph 1, further comprising adding an accelerator to the mixture.

14. The method of paragraph 13, wherein the accelerator comprises calcium sulfate dihydrate, potassium sulfate, or a combination thereof.

15. The method of paragraph 1, further comprising adding a dispersant to the mixture.

16. The method of paragraph 15, wherein the dispersant comprises polynaphthalene sulfonate, polycarboxylate, or a combination thereof.

17. The method of paragraph 1, further comprising adding a foaming agent to the mixture.

18. The method of paragraph 17, wherein the foaming agent comprises sulfonated alcohol ethoxylate.

19. The method of paragraph 1, further comprising adding a retarder to the mixture.

20. The method of paragraph 19, wherein the retarder comprises diethylenetriaminopentaacetates, polyacrylates salts, tartrates, a natural organic retarder, or any combination thereof.

21. A water-resistant gypsum board made from the method of any one of paragraphs 1-20.

22. A method for making a water-resistant gypsum board, comprising:
forming a mixture of water and hydroxide;
adding siloxane to the mixture;
adding calcium sulfate hemi-hydrate to the mixture to form an aqueous slurry;
curing the aqueous slurry under heat;
drying the aqueous slurry; and
forming a water-resistant gypsum board.

23. The method of paragraph 22, wherein the pH of the aqueous slurry is above 9.

24. The method of paragraph 22, wherein the hydroxide comprises metal hydroxide.

25. The method of paragraph 24, wherein the metal hydroxide comprises sodium hydroxide, potassium hydroxide, lithium hydroxide, rubidium hydroxide, caesium hydroxide, francium hydroxide, calcium dihydroxide, magnesium dihydroxide, beryllium dihydroxide, strontium dihydroxide, barium dihydroxide, and radium dihydroxide or a combination thereof.

26. The method of paragraph 22, wherein the hydroxide is in solid form or in solution form.

27. The method of paragraph 22, wherein curing the aqueous slurry comprises heating the aqueous slurry at a temperature of about 35° C. to about 300° C.

28. The method of paragraph 22, wherein drying the aqueous slurry comprises heating the aqueous slurry at a temperature of about 40° C. to about 300° C.

29. The method of paragraph 22, wherein the siloxane has the structure:

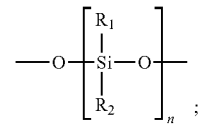

wherein $R_1$ is H, halogen, alkyl, aryl, heteroaryl, cycloalkyl, haloalkyl, haloaryl, perhaloalkyl, or perhaloaryl; $R_2$ is H, halogen, alkyl, aryl, heteroaryl, cycloalkyl, haloalkyl, haloaryl, perhaloalkyl, or perhaloaryl; and n is 1-100.

30. The method of paragraph 29, wherein the siloxane is poly(methylhydrogensiloxane).

31. The method of paragraph 22, further comprising adding an accelerator to the mixture.

32. The method of paragraph 31, wherein the accelerator comprises calcium sulfate dihydrate, potassium sulfate, or a combination thereof.

33. The method of paragraph 22, further comprising adding a dispersant to the mixture.

34. The method of paragraph 33, wherein the dispersant comprises polynaphthalene sulfonate, polycarboxylate, or a combination thereof.

35. The method of paragraph 22, further comprising adding a foaming agent to the mixture.

36. The method of paragraph 35, wherein the foaming agent comprises sulfonated alcohol ethoxylate.

37. The method of paragraph 22, further comprising adding a retarder to the mixture.

38. The method of paragraph 37, wherein the retarder comprises diethylenetriaminopentaacetates, polyacrylates salts, tartrates, a natural organic retarder, or any combination thereof.

39. A water-resistant gypsum board made from the method of any one of paragraphs 22-38.

40. A composition for the manufacture of gypsum board, comprising:
calcium sulfate hemi-hydrate;
siloxane;
hydroxide; and
siliconate.

41. The composition of paragraph 40, wherein the hydroxide comprises metal hydroxide.

42. The composition of paragraph 40, wherein the metal hydroxide comprises sodium hydroxide, potassium hydroxide, lithium hydroxide, rubidium hydroxide, caesium hydroxide, francium hydroxide, calcium dihydroxide, magnesium dihydroxide, beryllium dihydroxide, strontium dihydroxide, barium dihydroxide, and radium dihydroxide or a combination thereof.

43. The composition of paragraph 40, wherein the siliconate has the structure:

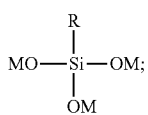

wherein R is H, halogen, alkyl, aryl, heteroaryl, cycloalkyl, haloalkyl, haloaryl, perhaloalkyl, or perhaloaryl; and M, in each occurrence independently, is sodium, potassium, or lithium.

44. The composition of paragraph 43, wherein the siliconate is sodium methyl siliconate.

45. The composition of paragraph 43, wherein the siliconate is potassium methyl siliconate.

46. The composition of paragraph 40, wherein the siloxane has the structure:

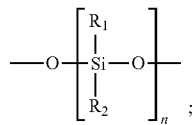

wherein $R_1$ is H, halogen, alkyl, aryl, heteroaryl, cycloalkyl, haloalkyl, haloaryl, perhaloalkyl, or perhaloaryl; $R_2$ is H, halogen, alkyl, aryl, heteroaryl, cycloalkyl, haloalkyl, haloaryl, perhaloalkyl, or perhaloaryl; and n is 1-100.

47. The composition of paragraph 46, wherein the siloxane is poly(methylhydrogensiloxane).

48. The composition of paragraph 40, further comprising an accelerator.

49. The composition of paragraph 48, wherein the accelerator comprises calcium sulfate dihydrate, potassium sulfate, or a combination thereof.

50. The composition of paragraph 40, further comprising a dispersant.

51. The composition of paragraph 50, wherein the dispersant comprises polynaphthalene sulfonate, polycarboxylate, or a combination thereof.

52. The composition of paragraph 40, further comprising a foaming agent.

53. The composition of paragraph 52, wherein the foaming agent comprises sulfonated alcohol ethoxylate.

54. The composition of paragraph 40, further comprising a retarder.

55. The composition of paragraph 54, wherein the retarder comprises diethylenetriaminopentaacetates, polyacrylates salts, tartrates, a natural organic retarder, or any combination thereof.

56. A composition for the manufacture of gypsum board, comprising:
calcium sulfate hemi-hydrate;
siloxane; and
hydroxide.

57. The composition of paragraph 56, wherein the hydroxide comprises metal hydroxide.

58. The composition of paragraph 57, wherein the metal hydroxide comprises sodium hydroxide, potassium hydroxide, lithium hydroxide, rubidium hydroxide, caesium hydroxide, francium hydroxide, calcium dihydroxide, magnesium dihydroxide, beryllium dihydroxide, strontium dihydroxide, barium dihydroxide, and radium dihydroxide or a combination thereof.

59. The composition of paragraph 56, wherein the siloxane has the structure:

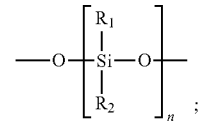

wherein $R_1$ is H, halogen, alkyl, aryl, heteroaryl, cycloalkyl, haloalkyl, haloaryl, perhaloalkyl, or perhaloaryl; $R_2$ is H, halogen, alkyl, aryl, heteroaryl, cycloalkyl, haloalkyl, haloaryl, perhaloalkyl, or perhaloaryl; and n is 1-100.

60. The composition of paragraph 59, wherein the siloxane is poly(methylhydrogensiloxane).

61. The composition of paragraph 56, further comprising an accelerator.

62. The composition of paragraph 61, wherein the accelerator comprises calcium sulfate dihydrate, potassium sulfate, or a combination thereof.

63. The composition of paragraph 56, further comprising a dispersant.

64 The composition of paragraph 63, wherein the dispersant comprises polynaphthalene sulfonate, polycarboxylate, or a combination thereof.

65. The composition of paragraph 56, further comprising a foaming agent.

66. The composition of paragraph 65, wherein the foaming agent comprises sulfonated alcohol ethoxylate.

67. The composition of paragraph 56, further comprising a retarder.

68. The composition of paragraph 67, wherein the retarder comprises diethylenetriaminopentaacetates, polyacrylates salts, tartrates, a natural organic retarder, or any combination thereof.

69. The composition of paragraph 40, comprising:
100 parts by weight calcium sulfate hemi-hydrate;
about 50 to about 100 parts by weight water;
about 0.1 to about 2.0 parts by weight siloxane;
about 0.025 to about 0.5 parts by weight hydroxide; and
about 0.1 to about 2.0 parts by weight siliconate.

70. The composition of paragraph 40, comprising:
100 parts by weight calcium sulfate hemi-hydrate;
about 50 to about 100 parts by weight water;
about 0.1 to about 2.0 parts by weight siloxane; and
about 0.025 to about 0.5 parts by weight hydroxide.

71. A water-resistant gypsum board, comprising:
a gypsum core that comprises a mixture of calcium sulfate hemi-hydrate, siloxane, hydroxide, and siliconate;
a fibrous mat at least partially penetrating a surface of the gypsum core.

72. A water-resistant gypsum board, comprising:
a gypsum core that comprises a mixture of calcium sulfate hemi-hydrate, siloxane, and hydroxide;
a fibrous mat at least partially penetrating a surface of the gypsum core.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for making a water-resistant gypsum board, comprising:
forming a mixture of water and hydroxide;
adding siloxane to the mixture;
adding siliconate to the mixture;
adding calcium sulfate hemi-hydrate to the mixture to form an aqueous slurry;
curing and/or
drying the aqueous slurry to
form a water-resistant gypsum board,
wherein the siliconate has the structure:

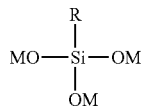

wherein R is H, halogen, alkyl, aryl, heteroaryl, cycloalkyl, haloalkyl, haloaryl, perhaloalkyl, or perhaloaryl; and M, in each occurrence independently, is sodium, potassium, or lithium.

2. The method of claim 1, wherein the pH of the aqueous slurry is above 9.

3. The method of claim 1, wherein the hydroxide is selected from the group consisting of sodium hydroxide, potassium hydroxide, lithium hydroxide, rubidium hydroxide, caesium hydroxide, francium hydroxide, calcium dihydroxide, magnesium dihydroxide, beryllium dihydroxide, strontium dihydroxide, barium dihydroxide, radium dihydroxide, and combinations thereof.

4. The method of claim 1, wherein curing the aqueous slurry comprises heating the aqueous slurry at a temperature of about 35° C. to about 300° C.

5. The method of claim 1, wherein the siloxane comprises the structure:

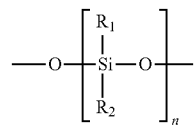

wherein $R_1$ is H, halogen, alkyl, aryl, heteroaryl, cycloalkyl, haloalkyl, haloaryl, perhaloalkyl, or perhaloaryl; $R_2$ is H, halogen, alkyl, aryl, heteroaryl, cycloalkyl, haloalkyl, haloaryl, perhaloalkyl, or perhaloaryl; and n is 1-100.

6. The method of claim 1, further comprising adding an accelerator to the mixture, wherein the accelerator comprises calcium sulfate dihydrate, potassium sulfate, or a combination thereof.

7. The method of claim 1, further comprising adding a dispersant to the mixture, the dispersant comprising polynaphthalene sulfonate, polycarboxylate, or a combination thereof.

8. The method of claim 1, further comprising adding a foaming agent to the mixture, the foaming agent comprising sulfonated alcohol ethoxylate.

9. The method of claim 1, further comprising adding a retarder to the mixture, the retarder comprising diethylenetriaminopentaacetates, polyacrylates salts, tartrates, a natural organic retarder, or any combination thereof.

10. A composition for the manufacture of gypsum board, comprising:
calcium sulfate hemi-hydrate;
siliconate;
siloxane; and
hydroxide,
wherein the siliconate has the structure:

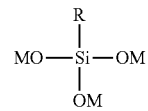

wherein R is H, halogen, alkyl, aryl, heteroaryl, cycloalkyl, haloalkyl, haloaryl, perhaloalkyl, or perhaloaryl; and M, in each occurrence independently, is sodium, potassium, or lithium.

11. The composition of claim 10, wherein the hydroxide is selected from the group consisting of sodium hydroxide, potassium hydroxide, lithium hydroxide, rubidium hydroxide, caesium hydroxide, francium hydroxide, calcium dihydroxide, magnesium dihydroxide, beryllium dihydroxide, strontium dihydroxide, barium dihydroxide, and radium dihydroxide or a combination thereof.

12. The composition of claim 10, wherein the siloxane comprises the structure:

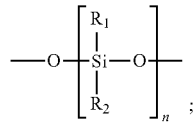

wherein $R_1$ is H, halogen, alkyl, aryl, heteroaryl, cycloalkyl, haloalkyl, haloaryl, perhaloalkyl, or perhaloaryl; $R_2$ is H, halogen, alkyl, aryl, heteroaryl, cycloalkyl, haloalkyl, haloaryl, perhaloalkyl, or perhaloaryl; and n is 1-100.

13. The composition of claim 10, comprising:
100 parts by weight calcium sulfate hemi-hydrate;
about 0.1 to about 2.0 parts by weight siloxane; and
about 0.025 to about 0.5 parts by weight hydroxide.

14. The composition of claim 10, comprising:
100 parts by weight calcium sulfate hemi-hydrate;
about 0.1 to about 2.0 parts by weight siloxane;
about 0.025 to about 0.5 parts by weight hydroxide;
and about 0.1 to about 2.0 parts by weight siliconate.

15. A water-resistant gypsum board, comprising:
a gypsum core that comprises a mixture of calcium sulfate hemi-hydrate, siloxane, siliconate, and hydroxide; and
a fibrous mat at least partially penetrating a surface of the gypsum core,
wherein the siliconate has the structure:

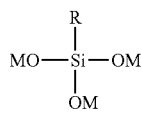

wherein R is H, halogen, alkyl, aryl, heteroaryl, cycloalkyl, haloalkyl, haloaryl, perhaloalkyl, or perhaloaryl; and M, in each occurrence independently, is sodium, potassium, or lithium.

16. A composition for the manufacture of gypsum board, comprising:
100 parts by weight calcium sulfate hemi-hydrate;
about 0.1 to about 2.0 parts by weight siloxane;
about 0.025 to about 0.5 parts by weight hydroxide; and
about 0.1 to about 2.0 parts by weight siliconate.

* * * * *